United States Patent
Dai et al.

(10) Patent No.: US 10,794,596 B2
(45) Date of Patent: Oct. 6, 2020

(54) DUAL FUEL NOZZLE WITH LIQUID FILMING ATOMIZATION FOR A GAS TURBINE ENGINE

(71) Applicant: UNITED TECHNOLOGIES CORPORATION, Hartford, CT (US)

(72) Inventors: Zhongtao Dai, Manchester, CT (US); Randolph J Smith, Ellington, CT (US); Kristin Kopp-Vaughan, East Hartford, CT (US); Timothy S. Snyder, Glastonbury, CT (US); Donald J Hautman, Marlborough, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1095 days.

(21) Appl. No.: 14/914,825

(22) PCT Filed: Aug. 19, 2014

(86) PCT No.: PCT/US2014/051589
§ 371 (c)(1),
(2) Date: Feb. 26, 2016

(87) PCT Pub. No.: WO2015/069354
PCT Pub. Date: May 14, 2015

(65) Prior Publication Data
US 2016/0209037 A1    Jul. 21, 2016

Related U.S. Application Data

(60) Provisional application No. 61/872,363, filed on Aug. 30, 2013.

(51) Int. Cl.
*F23R 3/36* (2006.01)
*F23R 3/12* (2006.01)
(Continued)

(52) U.S. Cl.
CPC .............. *F23R 3/12* (2013.01); *F02C 7/22* (2013.01); *F23D 11/101* (2013.01);
(Continued)

(58) Field of Classification Search
None
See application file for complete search history.

(56) References Cited

U.S. PATENT DOCUMENTS 3,691,765 A * 9/1972 Carlisle ................ F23D 17/002
239/432
3,853,273 A * 12/1974 Bahr ........................ F23R 3/14
239/402
(Continued)

FOREIGN PATENT DOCUMENTS

CA    2384153 A1 *  6/2001    .............. F23D 11/36
EP    2 172 709 A2    4/2010
(Continued)

OTHER PUBLICATIONS

European Office action dated Jul. 30, 2018 for European Patent Application No. 14859549.9.
(Continued)

*Primary Examiner* — Gerald L Sung
*Assistant Examiner* — Marc J Amar
(74) *Attorney, Agent, or Firm* — Bachman & LaPointe, P.C.

(57) ABSTRACT

A fuel nozzle for a combustor of a gas turbine engine includes an outer air swirler along an axis, said outer air swirler defines an outer annular air passage between an outer wall and an inner wall, the outer wall defines a convergent-divergent nozzle. An inner air swirler along the axis to define an annular liquid passage therebetween, the annular liquid passage terminates upstream of the convergent-divergent
(Continued)

nozzle and an annular fuel gas passage around the axis between the outer air swirler and the inner air swirler.

22 Claims, 9 Drawing Sheets

(51) Int. Cl.
  *F23R 3/28*   (2006.01)
  *F23D 11/38*   (2006.01)
  *F23R 3/14*   (2006.01)
  *F23D 11/10*   (2006.01)
  *F23D 11/12*   (2006.01)
  *F23D 17/00*   (2006.01)
  *F02C 7/22*   (2006.01)

(52) U.S. Cl.
  CPC .......... *F23D 11/103* (2013.01); *F23D 11/105* (2013.01); *F23D 11/12* (2013.01); *F23D 11/383* (2013.01); *F23D 17/002* (2013.01); *F23R 3/14* (2013.01); *F23R 3/28* (2013.01); *F23R 3/283* (2013.01); *F23R 3/286* (2013.01); *F23R 3/36* (2013.01); *F23D 2204/10* (2013.01); *F23D 2900/11101* (2013.01); *Y02T 50/60* (2013.01)

(56) References Cited

U.S. PATENT DOCUMENTS

| | | | |
|---|---|---|---|
| 3,866,413 A | 2/1975 | Sturgess | |
| 4,726,192 A * | 2/1988 | Willis | F23D 17/002 60/737 |
| 4,977,740 A | 12/1990 | Madden et al. | |
| 5,044,559 A * | 9/1991 | Russell | F23D 11/107 239/406 |
| 5,339,845 A * | 8/1994 | Huddas | B08B 9/00 134/169 A |
| 5,423,173 A * | 6/1995 | Lemon | F23D 17/002 60/39.463 |
| 5,505,045 A | 4/1996 | Lee et al. | |
| 5,647,538 A * | 7/1997 | Richardson | F23D 11/101 239/405 |
| 6,256,995 B1 * | 7/2001 | Sampath | F23D 11/36 60/740 |
| 6,363,725 B1 * | 4/2002 | Mei | F23R 3/286 60/737 |
| 6,381,964 B1 * | 5/2002 | Pritchard, Jr. | F23R 3/14 60/746 |
| 8,348,180 B2 * | 1/2013 | Mao | F23D 11/107 239/403 |
| 10,132,499 B2 * | 11/2018 | Matsuyama | F23R 3/14 |
| 2002/0011064 A1 | 1/2002 | Crocker et al. | |
| 2005/0103019 A1 * | 5/2005 | Mansour | F02C 7/22 60/776 |
| 2005/0198965 A1 * | 9/2005 | Henriquez | F23R 3/16 60/740 |
| 2006/0248898 A1 * | 11/2006 | Buelow | F23R 3/28 60/776 |
| 2007/0033919 A1 * | 2/2007 | Tanimura | F23R 3/343 60/39.463 |
| 2007/0137207 A1 | 6/2007 | Mancini et al. | |
| 2007/0207425 A1 * | 9/2007 | Brautsch | F23D 11/108 431/159 |
| 2008/0078181 A1 * | 4/2008 | Mueller | F23R 3/286 60/776 |
| 2009/0255120 A1 * | 10/2009 | McMasters | F23R 3/14 29/889.2 |
| 2009/0255258 A1 * | 10/2009 | Bretz | F23D 11/107 60/737 |
| 2010/0083663 A1 * | 4/2010 | Fernandes | F23R 3/286 60/748 |
| 2010/0308135 A1 * | 12/2010 | Yamamoto | F23R 3/286 239/402 |
| 2011/0089264 A1 | 4/2011 | Thomson et al. | |
| 2012/0073302 A1 * | 3/2012 | Myers | F23D 11/402 60/748 |
| 2012/0151930 A1 * | 6/2012 | Patel | F23D 11/386 60/746 |
| 2012/0304650 A1 * | 12/2012 | Hernandez | F23R 3/343 60/737 |
| 2013/0047620 A1 | 2/2013 | Mao et al. | |
| 2014/0234787 A1 * | 8/2014 | De La Sovera | F23L 9/02 431/12 |
| 2016/0252252 A1 * | 9/2016 | Dai | F02C 3/04 60/740 |
| 2017/0108223 A1 * | 4/2017 | Ryon | F23R 3/12 |

FOREIGN PATENT DOCUMENTS

| | | | | |
|---|---|---|---|---|
| GB | 2016673 A | * | 9/1979 | .......... F23D 17/002 |
| GB | 2035540 A | * | 6/1980 | .......... F23D 17/002 |
| JP | 2009074798 A | | 4/2009 | |
| WO | WO-2014081334 A1 | * | 5/2014 | .............. F23D 11/36 |
| WO | WO-2015150089 A1 | * | 10/2015 | ................ F23R 3/36 |

OTHER PUBLICATIONS

European search report for Application No. 14859549.9-1602 dated Mar. 16, 2017.

* cited by examiner

DUAL FUEL NOZZLE WITH LIQUID FILMING ATOMIZATION FOR A GAS TURBINE ENGINE

CROSS-REFERENCE TO RELATED APPLICATION

This application claims the benefit of provisional application Ser. No 61/872,363, filed Aug. 30, 2013.

BACKGROUND

The present disclosure relates to a gas turbine engine and, more particularly, to dual fuel nozzles with passages for both a liquid and a gas.

Gas turbine engines, such as Industrial Gas Turbines utilized in power production, mechanical drives as well as aero engines in commercial and military aircraft, include a compressor section to pressurize airflow, a combustor section to burn a hydrocarbon fuel in the presence of the pressurized air, and a turbine section to extract energy from the resultant combustion gases.

The combustor section includes a multiple of circumferentially distributed fuel nozzles that project into a forward section of a combustion chamber to supply fuel to mix with the pressurized airflow. The fuel nozzles may simultaneously utilize different types and combinations of fuel such as Jet-A, diesel, JP8, natural gas and others. Further, to facilitate lower NOx emissions, water may be injected though the nozzle as well. Although effective, the water-to-fuel ratio may be undesirably high and result in decreased circumferential uniformity and swirl.

SUMMARY

A fuel nozzle for a combustor of a gas turbine engine according to one disclosed non-limiting embodiment of the present disclosure includes an outer air swirler along an axis, the outer air swirler defines an outer annular air passage between an outer wall and an inner wall, the outer wall defines a convergent-divergent nozzle.

A further embodiment of the present disclosure includes an inner air swirler along the axis to define an annular fuel gas passage around the axis between the outer air swirler and the inner air swirler.

A further embodiment of any of the foregoing embodiments of the present disclosure includes, wherein the annular fuel gas passage terminates with a multiple of apertures.

A further embodiment of any of the foregoing embodiments of the present disclosure includes, wherein the annular fuel gas passage terminates with a multiple of skewed slots.

A further embodiment of any of the foregoing embodiments of the present disclosure includes, wherein the outer wall axially extends beyond the inner air swirler.

A further embodiment of any of the foregoing embodiments of the present disclosure includes, wherein the outer wall defines a filming region from about 0-55% of a length of the outer wall axially beyond the inner air swirler.

A further embodiment of any of the foregoing embodiments of the present disclosure includes, wherein the outer wall defines a divergent section at an angle of between 0-30 degrees with respect to the axis.

A further embodiment of any of the foregoing embodiments of the present disclosure includes an air inflow tube with a helical inflow vane along the axis within the inner air swirler, the air inflow tube defines a central air passage.

A further embodiment of any of the foregoing embodiments of the present disclosure includes, wherein the inner air swirler defines an annular liquid passage therebetween.

A further embodiment of any of the foregoing embodiments of the present disclosure includes a tube transverse to the inner air swirler to transport a liquid therethrough.

A further embodiment of any of the foregoing embodiments of the present disclosure includes, wherein an end section of the annular liquid passage is turned radially inward.

A fuel nozzle for a combustor of a gas turbine engine according to another disclosed non-limiting embodiment of the present disclosure includes an outer air swirler along an axis, the outer air swirler defines an outer annular air passage between an outer wall and an inner wall, the outer wall defines a convergent-divergent nozzle; and an inner air swirler along the axis to define an annular liquid passage therebetween, the annular liquid passage terminates upstream of the convergent-divergent nozzle and an annular fuel gas passage around the axis between the outer air swirler and the inner air swirler.

A further embodiment of any of the foregoing embodiments of the present disclosure includes wherein the outer wall axially extends beyond the inner air swirler.

A further embodiment of any of the foregoing embodiments of the present disclosure includes, wherein the outer wall defines a filming region from about 0-55% of a length of the outer wall axially beyond the inner air swirler.

A further embodiment of any of the foregoing embodiments of the present disclosure includes, wherein the outer wall defines a divergent section at an angle of between about 0-30 degrees with respect to the axis.

A further embodiment of any of the foregoing embodiments of the present disclosure includes, wherein the outer wall defines a divergent section with a filming region from about 0-55% of a length of the outer wall axially beyond the inner air swirler, the divergent section defined at an angle of between about 0-30 degrees with respect to the axis.

A method of directing a fuel gas and a liquid through a fuel nozzle and into a combustor of a gas turbine engine according to another disclosed non-limiting embodiment of the present disclosure includes directing an airflow through an outer annular air passage around an axis; directing the fuel gas through an annular fuel gas passage radially within the outer annular air passage; and directing the liquid though an annular liquid passage radially within the annular fuel gas passage, the liquid at least partially impacting upon a filming region of a convergent divergent nozzle.

A further embodiment of any of the foregoing embodiments of the present disclosure includes swirling airflow through a central inflow tube along the axis.

A further embodiment of any of the foregoing embodiments of the present disclosure includes directing the airflow through the outer annular air passage at least partially radially inward, the outer annular air passage at least partially defined by an outer wall which forms the convergent divergent nozzle.

A further embodiment of any of the foregoing embodiments of the present disclosure includes directing the liquid at least partially radially inward.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
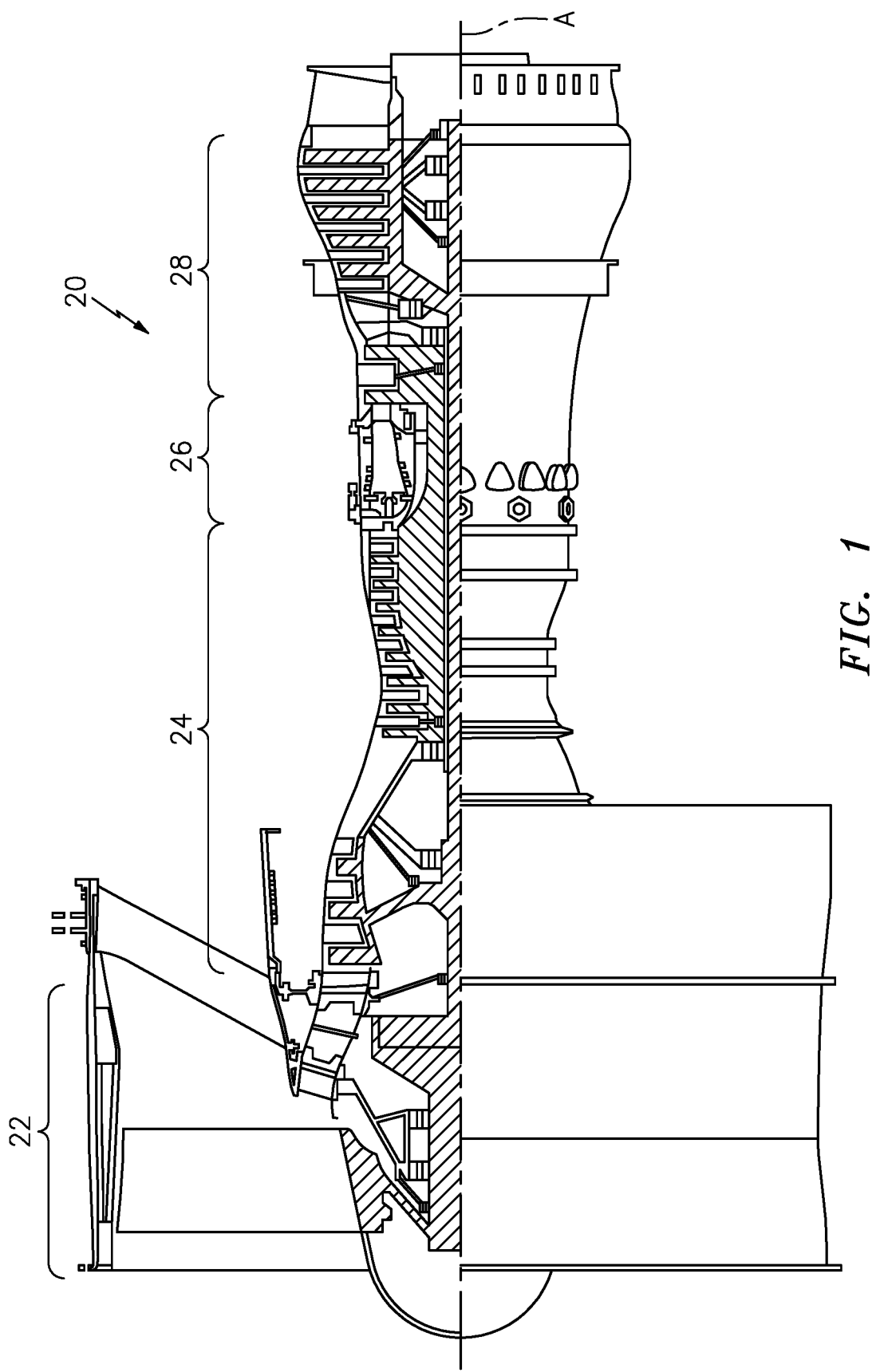
FIG. 1 is a schematic cross-section of an example gas turbine engine architecture.
Figure 2:
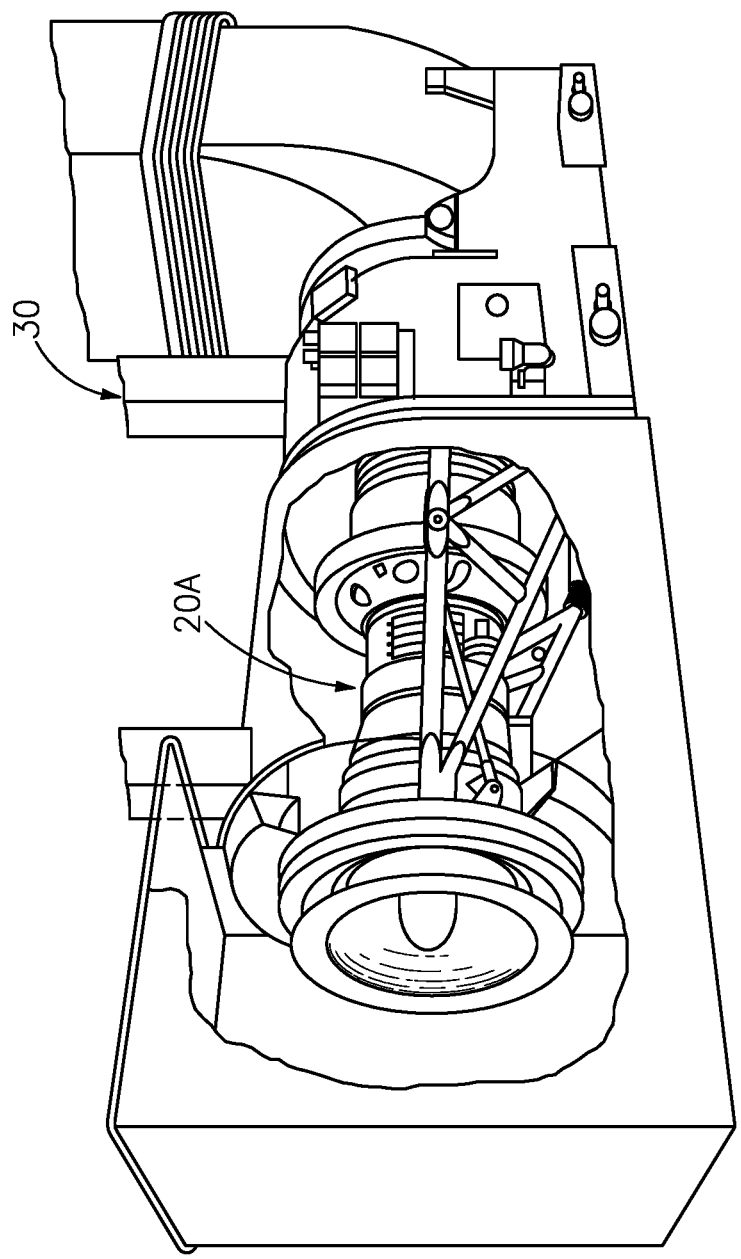
FIG. 2 is a schematic cross-section of another example gas turbine engine architecture.

FIG. 1 schematically illustrates a gas turbine engine 20. The gas turbine engine 20 is disclosed herein as a two-spool turbo fan that generally includes a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans with an intermediate spool. Still other engine architectures 20A are located within an enclosure 30 (FIG. 2) typical of an industrial gas turbine (IGT).

Figure 3:
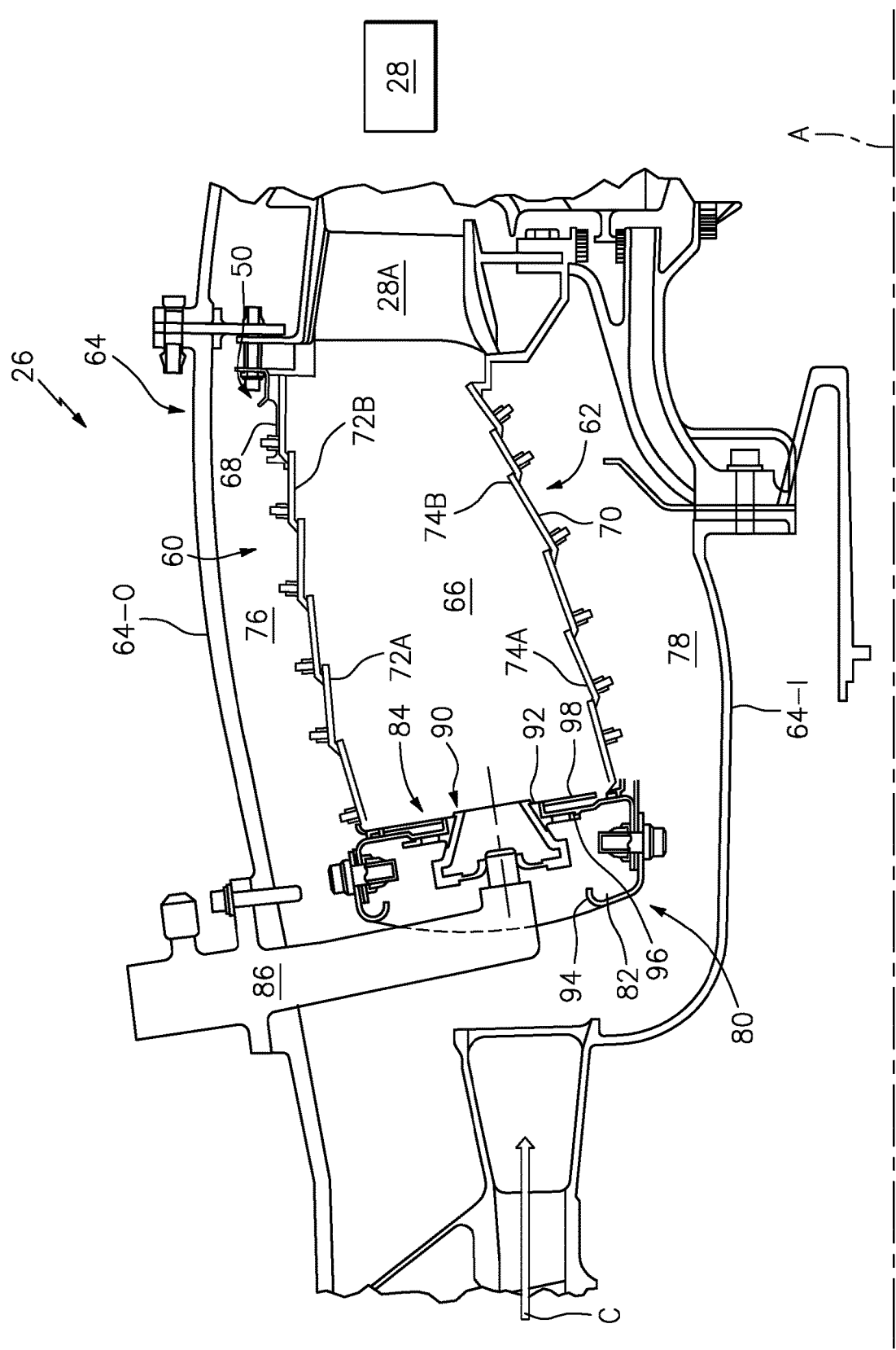
FIG. 3 is an expanded longitudinal schematic sectional view of a combustor section according to one non-limiting embodiment.

With reference to FIG. 3, the combustor section 26 generally includes a combustor 50 with an outer combustor wall assembly 60, an inner combustor wall assembly 62 and a diffuser case 64. The outer combustor wall assembly 60 and the inner combustor wall assembly 62 are spaced apart such that a combustion chamber 66 is defined therebetween. The combustion chamber 66 may be generally annular in shape.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68. A multiple of forward liner panels 74A and a multiple of aft liner panels 74B are circumferentially staggered to line the hot side of the inner shell 70.

The combustor 50 further includes a forward assembly 80 immediately downstream of the compressor section 24 to receive compressed airflow therefrom. The forward assembly 80 generally includes an annular hood 82 and a bulkhead assembly 84 which locate a multiple of fuel nozzles 86 (one shown) and a multiple of swirlers 90 (one shown). Each of the swirlers 90 is mounted within an opening 92 of the bulkhead assembly 84 to be circumferentially aligned with one of a multiple of annular hood ports 94. Each bulkhead assembly 84 generally includes a bulkhead support shell 96 secured to the combustor wall assembly 60, 62, and a multiple of circumferentially distributed bulkhead liner panels 98 secured to the bulkhead support shell 96.

The annular hood 82 extends radially between, and is secured to, the forwardmost ends of the combustor wall assemblies 60, 62. The annular hood 82 forms the multiple of circumferentially distributed hood ports 94 that accommodate the respective fuel nozzle 86 and introduce air into the forward end of the combustion chamber 66. Each fuel nozzle 86 may be secured to the diffuser case module 64 and project through one of the hood ports 94 and the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 28A. The NGVs 28A are static engine components which direct the combustion gases onto the turbine blades in the turbine section 28 to facilitate the conversion of pressure energy into kinetic energy. The combustion gases are also accelerated by the NGVs 28A because of their convergent shape and are typically given a "spin" or a "swirl" in the direction of turbine rotation.

Figure 4:
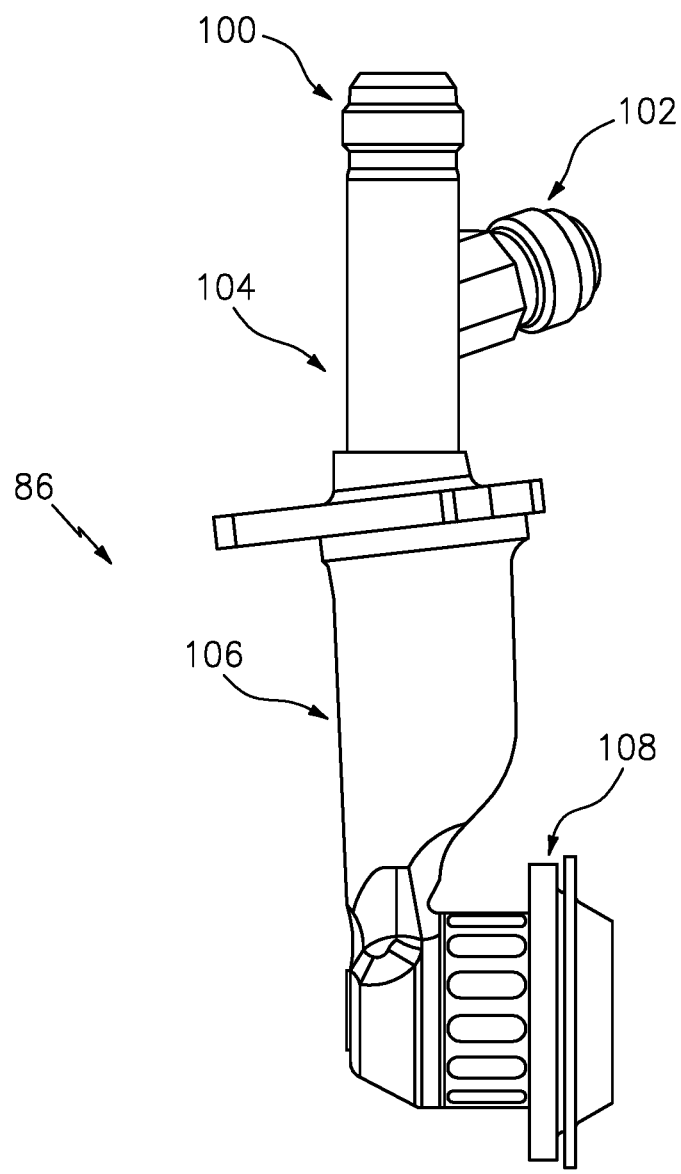
FIG. 4 is an isometric view of a fuel injector.

With reference to FIG. 4, each fuel injector 86 generally includes a first inlet 100 and a second inlet 102 defined by an inlet housing 104, a support housing 106 and a nozzle assembly 108. The first inlet 100 is transverse to the second inlet 102. The inlet housing 104 is received within the support housing 106 and a tube 110 extends through the housings 102, 104 (FIG. 5).

Figure 5:
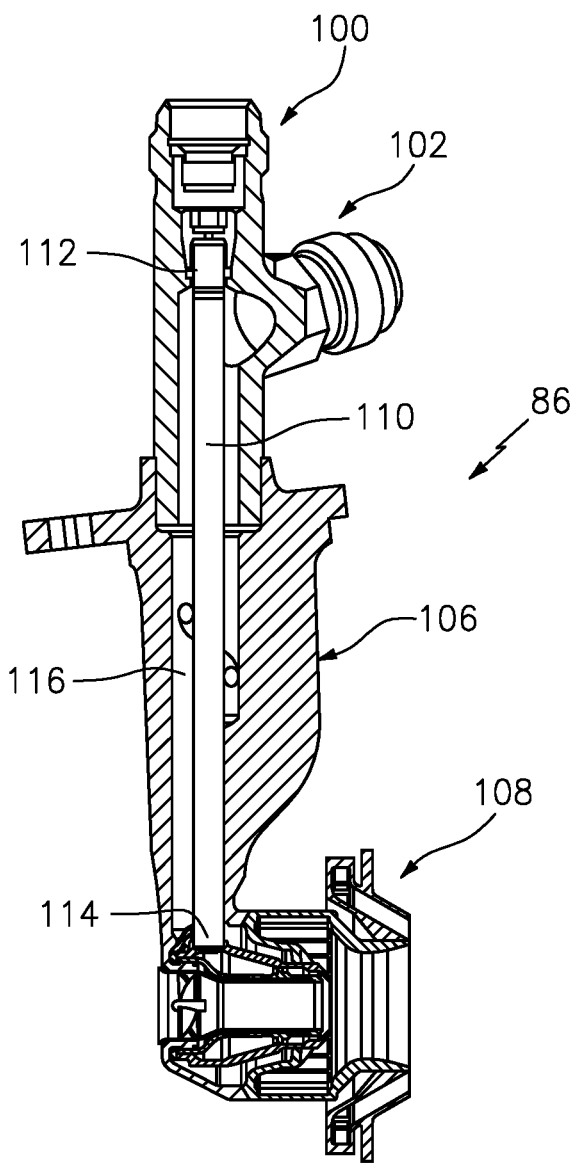
FIG. 5 is a sectional view of the fuel injector of FIG. 4.

With reference to FIG. 5, the first inlet 100 may receive a first fluid such as a liquid and the second inlet 102 may receive a second fluid such as a gas. The fuel injector 86 in the disclosed non-limiting embodiment provides concentric passages for a liquid such as Jet-A, diesel, JP8, water and combinations thereof as well as a gas such as natural gas. Each of the fuels are communicated through separate concentric passages within the fuel injector 86 such that gas turbine engine 20 readily operates on either fuel or combinations thereof.

The tube 110 separates the liquid from the gas. The tube 110 is secured within the inlet housing 104 with a seal such as an O-ring at one end section 112 and at the opposite end section 114 in the nozzle assembly 108 via a braze, weld, thread or other attachment. The tube 110 defines an annular gas passage 116 within the housings 104, 106 that operates as a heat shield to minimize or prevent coking of the liquid through the tube 110.

Figure 6:
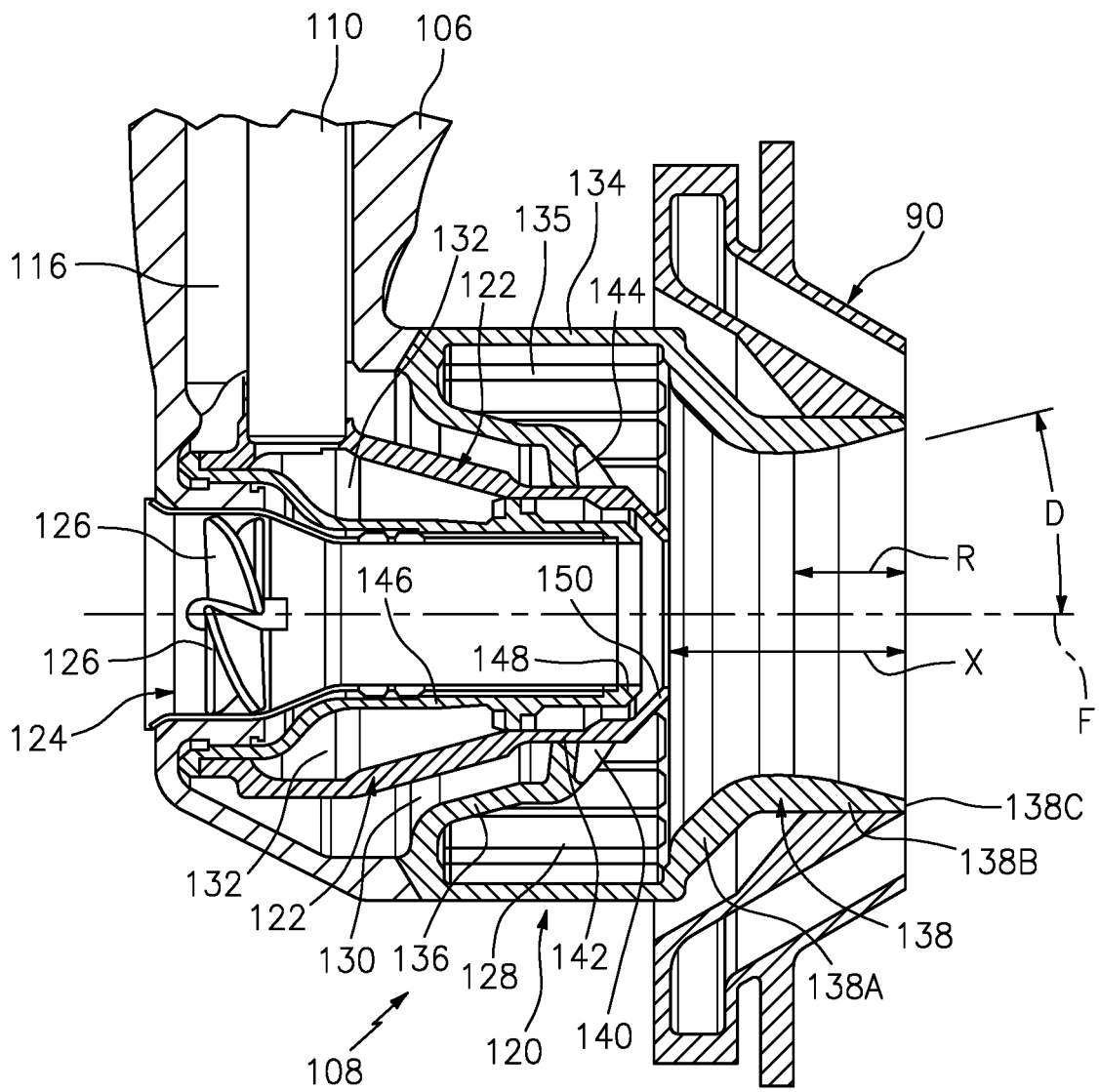
FIG. 6 is an expanded sectional view of a fuel nozzle.

With reference to FIG. 6, the nozzle assembly 108 is at least partially received within the swirler 90 and generally includes an outer air swirler 120, an inner air swirler 122 and an air inflow tube 124 with a helical inflow vane 126 along a nozzle axis F. The outer wall 134 of the outer air swirler 120 includes a multiple of axial slots 135 which receive airflow therethrough.

An outer annular air passage 128 is defined around axis F and within the outer air swirler 120. An annular fuel gas passage 130 is defined around axis F and between the outer air swirler 120 and the inner air swirler 122. The annular fuel gas passage 130 receives the fuel gas from within the annular gas passage 116 around the tube 110. An annular liquid passage 132 is defined around axis F and within the inner air swirler 122. The annular liquid passage 132 receives the liquid from within the tube 110. A central air passage 125 is defined along axis F within the air inflow tube 124.

The outer annular air passage 128 is generally defined between the outer wall 134 and an inner wall 136 of the outer air swirler 120. An end section 138 of the outer wall 134 extends beyond an end section 140 of the inner wall 136 and the annular liquid passage 132. The end section 138 of the outer wall 134 includes a convergent section 138A and a divergent section 138B. That is, the end section 138 defines a convergent-divergent nozzle with an essentially asymmetric hourglass-shape downstream of the inner air swirler 122 and the air inflow tube 124.

In one disclosed non-limiting embodiment, the divergent section 138B defines an angle D of between about zero-thirty (0-30) degrees with respect to the nozzle axis F. The end section 138 defines a length X which, in the disclosed non-limiting embodiment, is about 0-0.75 inches (0-19 mm) with a filming region R of about 0-0.4 inches (0-10 mm) That is, the length R defines from about 0-55% of the length X. The filming region R may extend to a distal end 138C of the divergent section 138B. It should be appreciated that various geometries outer air swirler 120 will benefit herefrom.

Figure 7:
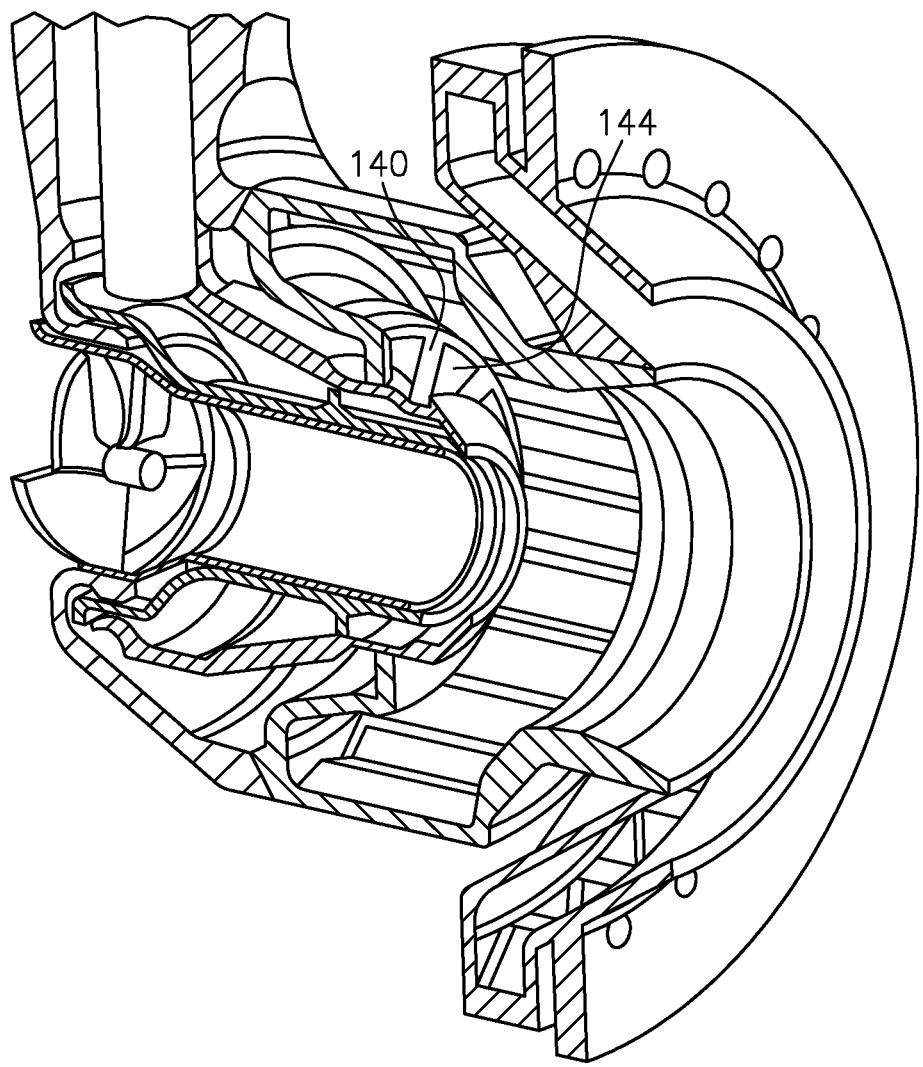
FIG. 7 is a perspective sectional view of the fuel nozzle.
Figure 8:
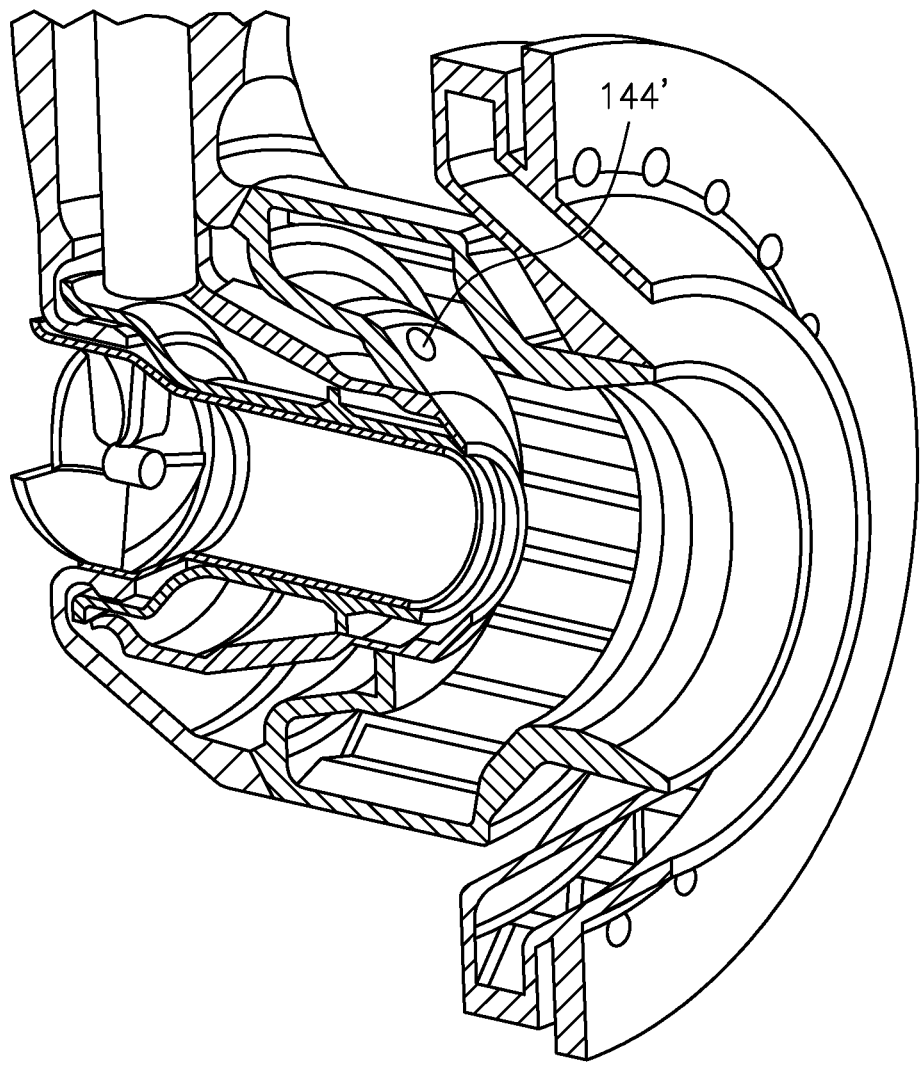
FIG. 8 is an expanded front view of the fuel nozzle.

The end section 140 of the inner wall 136 abuts an outer wall 142 of the inner air swirler 122 to defines a multiple of openings 144 which in this disclosed non-limiting embodiment are skewed slots (best seen in FIG. 7) to form an axial swirled exit for the annular gas passage 130. That is, the annular gas passage 130 terminates with the multiple of openings 144 direct the fuel gas axially and imparts a swirl thereto. In another disclosed non-limiting embodiment, the annular gas passage 130 terminates with a multiple of openings 144' that are generally circular passages (FIG. 8). That is, the multiple of apertures 144'. It should be appreciated that other geometries may alternatively be provided.

The annular gas passage 130 communicates essentially all, e.g., about one hundred (100) percent of the fuel gas through the multiple of openings 144. The multiple of openings 144 direct the fuel gas axially and imparts a swirl thereto. The multiple of openings 144 decrease the injection area and increase axial swirl momentum to increase circumferential uniformity, total air swirl due to the angle of gas injection and increase air stream mixing downstream of nozzle to facilitate fuel-air mixing.

Each of the multiple of openings 144 in the disclosed non-limiting embodiment are skewed quadrilaterals in shape (best seen in FIG. 8). In one disclosed non-limiting embodiment, the multiple of openings 144 are skewed at an angle α (FIG. 9) between about fifty to sixty (50-60) degrees around the axis F.

The outer wall 142 and an inner wall 146 of the inner air swirler 122 define the annular liquid passage 132. An end section 148 of the outer wall 142 and an end section 150 of the inner wall 146 may be turned radially inward toward axis F to direct the liquid at least partially radially inward.

The air inflow tube 124 is mounted within the inner wall 146 and includes the upstream helical inflow vane 126 to swirl the airflow therethrough. Due in part to the swirled airflow through the air inflow tube 124, the liquid spray expands from the annular liquid passage 132 and impacts upon the filing region R to re-film/re-atomize. The increased liquid injection recession causes large drops to re-film/re-atomization on larger wall surface, resulting smaller drop size and higher penetration which increasing water vaporization rate as well as positioning water in desirable location. The reduced water drop size and the effective utilization of water facilitates a decrease in NOx emissions with reduced water injection (i.e. lower water-to-fuel ratio)

Figure 9:
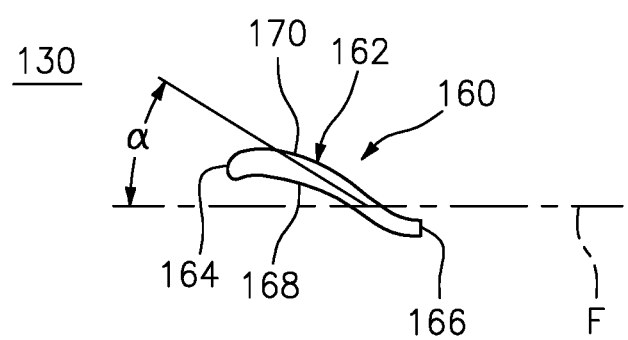
FIG. 9 is a schematic radially inward looking view of a vane for the fuel nozzle according to one disclosed non-limiting embodiment.

With reference to FIG. 9, each of the multiple of openings 144 are at least partially defined by a vane 160 within the annular fuel gas passage 130. Each vane 160 is defined by an airfoil wall surface 162 between a leading edge 164 and a trailing edge 166 to define a generally concave shaped portion to form a pressure side 168 and a generally convex shaped portion forming a suction side 170. Each vane 160 is angled with respect to the axis F at the aforementioned angle α of about fifty to sixty (50-60) degrees such that the trailing edge 166 thereof, the outer air swirler 120 and the inner air swirler 122 form the skewed quadrilateral exits of the openings 144 (FIG. 8).

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel nozzle for a combustor of a gas turbine engine comprising:
   an outer air swirler along a nozzle axis, said outer air swirler defines an outer annular air passage between an outer wall and an inner wall, said outer wall defines a convergent-divergent nozzle;
   an inner air swirler along said nozzle axis to define an annular fuel gas passage around said nozzle axis between said outer air swirler and said inner air swirler, said annular fuel gas passage terminates with a multiple of skewed slots, oriented axially and upstream of the convergent-divergent nozzle, to direct a fuel gas and impart a swirl thereto;
   an annular liquid passage surrounding a helical inflow vane and defined around said nozzle axis and within the inner air swirler; and
   an air inflow tube with the helical inflow vane along said nozzle axis within said inner air swirler, said air inflow tube defines a central air passage.

2. The fuel nozzle as recited in claim 1, wherein said outer wall axially extends beyond said inner air swirler.

3. The fuel nozzle as recited in claim 2, wherein said outer wall defines a filming region from about 0-55% of a length of said outer wall axially beyond said inner air swirler.

4. The fuel nozzle as recited in claim 2, wherein a divergent section of said outer wall defines an angle of between 0-30 degrees with respect to said axis.

5. The fuel nozzle as recited in claim 4, wherein said inner air swirler defines said annular liquid passage therebetween, said annular liquid passage receives a liquid fuel from within a second tube that terminates in the inner air swirler and separates the liquid fuel from the fuel gas.

6. The fuel nozzle as recited in claim 5, wherein said second tube is transverse to said nozzle axis.

7. The fuel nozzle as recited in claim 6, wherein an end section of said annular liquid passage is turned radially inward toward said nozzle axis to direct the liquid fuel at least partially radially inward.

8. A fuel nozzle for a combustor of a gas turbine engine comprising:
   an outer air swirler along a nozzle axis, said outer air swirler defines an outer annular air passage between an outer wall and an inner wall, said outer wall defines a convergent-divergent nozzle; and
   an inner air swirler along said axis to define an annular liquid passage therebetween and an annular fuel gas passage, said annular liquid passage surrounding a helical inflow vane and defined around said nozzle axis and within the inner swirler, said annular liquid passage terminates upstream of said convergent-divergent nozzle;
   said annular fuel gas passage around said axis between said outer air swirler and said inner air swirler, said annular fuel gas passage terminates with a multiple of skewed slots, oriented axially and upstream of the convergent-divergent nozzle, to direct a fuel gas and impart a swirl thereto; and
   an air inflow tube with the helical inflow vane along said nozzle axis within said inner air swirler, said air inflow tube defines a central air passage.

9. The fuel nozzle as recited in claim 8, wherein said outer wall axially extends beyond said inner air swirler.

10. The fuel nozzle as recited in claim 8, wherein said outer wall defines a filming region from about 0-55% of a length of said outer wall axially beyond said inner air swirler.

11. The fuel nozzle as recited in claim 8, wherein said outer wall defines a divergent section at an angle of between about 0-30 degrees with respect to said axis.

12. The fuel nozzle as recited in claim 8, wherein said outer wall defines a divergent section with a filming region from about 0-55% of a length of said outer wall axially beyond said inner air swirler, said divergent section defined at an angle of between about 0-30 degrees with respect to said axis.

13. A method of directing a fuel gas and a liquid through a fuel nozzle and into a combustor of a gas turbine engine, comprising:
   directing an airflow through an outer annular air passage around a nozzle axis;
   directing the fuel gas through an annular fuel gas passage radially within the outer annular air passage; and
   directing the liquid though an annular liquid passage radially within the annular fuel gas passage, the liquid at least partially impacting upon a filming region of a convergent-divergent nozzle;
   the fuel nozzle comprising an outer air swirler along the nozzle axis, said outer air swirler defines the outer annular air passage between an outer wall and an inner wall, said outer wall defines the convergent-divergent nozzle;
   an inner air swirler along said nozzle axis to define the annular fuel gas passage around said nozzle axis between said outer air swirler and said inner air swirler, said annular fuel gas passage terminates with a multiple of skewed slots, oriented axially and upstream of the convergent-divergent nozzle, to direct the fuel gas and impart a swirl thereto;
   the annular liquid passage surrounding a helical inflow vane and defined around said nozzle axis and within the inner air swirler; and
   an air inflow tube with the helical inflow vane along said nozzle axis within said inner air swirler, said air inflow tube defines a central air passage.

14. The method as recited in claim 13, further comprising: swirling airflow through a central the air inflow tube along the axis.

15. The method as recited in claim 13, further comprising: directing the airflow through the outer annular air passage at least partially radially inward, the outer annular air passage at least partially defined by the outer wall which forms the convergent divergent nozzle.

16. The method as recited in claim 15, further comprising: directing the liquid at least partially radially inward.

17. A fuel nozzle for a combustor of a gas turbine engine comprising:
   an outer air swirler along a nozzle axis, said outer air swirler defines an outer annular air passage between an outer wall and an inner wall, said outer wall defines a convergent-divergent nozzle;
   an inner air swirler along said nozzle axis to define an annular fuel gas passage around said nozzle axis between said outer air swirler and said inner air swirler, said annular fuel gas passage terminates with a multiple of skewed slots, oriented axially and upstream of the convergent-divergent nozzle, to direct a fuel gas and impart a swirl thereto;
   an annular liquid passage surrounding a helical inflow vane and defined around said nozzle axis and within the inner air swirler, said annular liquid passage receives the liquid fuel from within a tube that terminates in the inner air swirler and separates the liquid fuel from the fuel gas; and an air inflow tube with the helical inflow vane along said nozzle axis within said annular liquid passage, said air inflow tube defines a central air passage.

18. The fuel nozzle as recited in claim 17, wherein said outer wall defines a filming region from about 0-55% of a length of said outer wall axially beyond said inner air swirler.

19. The fuel nozzle as recited in claim 18, wherein said inner air swirler defines the annular liquid passage therebetween.

20. The fuel nozzle as recited in claim 19, wherein an end section of said annular liquid passage is turned radially inward.

21. The fuel nozzle as recited in claim 17, wherein said outer wall extends beyond said inner air swirler and defines a divergent section at an angle of between 0-30 degrees with respect to said axis.

22. The fuel nozzle as recited in claim 17, wherein said outer wall defines a filming region from about 0-55% of a length of said outer wall axially beyond said inner air swirler.

* * * * *